United States Patent [19]
Klinkman et al.

[11] 3,803,341
[45] Apr. 9, 1974

[54] INSERTION-TYPE MOUNTING FOR AN ELECTRICAL OUTLET

[75] Inventors: Richard A. Klinkman, New Baden, Ill.; Robert E. Lee, St. Louis, Mo.

[73] Assignee: Mac-Fab Products, Inc., St. Louis, Mo.

[22] Filed: Feb. 20, 1973

[21] Appl. No.: 333,864

[52] U.S. Cl. ............................................. 174/48
[51] Int. Cl. ........................................... H02g 3/08
[58] Field of Search ............ 174/48, 49, 98; 52/220, 52/221

[56] References Cited
UNITED STATES PATENTS

| | | | |
|---|---|---|---|
| 3,303,264 | 2/1967 | Saul et al. | 174/48 |
| 3,592,956 | 7/1971 | Fork | 174/49 |
| 3,751,576 | 8/1973 | Klinkman et al. | 174/48 |

*Primary Examiner*—Bernard A. Gilheany
*Assistant Examiner*—David A. Tone
*Attorney, Agent, or Firm*—Rogers, Ezell & Eilers

[57] ABSTRACT

An insertion-type mounting, for an electrical outlet, can be inserted within an aperture that has been formed in a portion of a building; and that mounting includes a closure which is insertable within that aperture to effectively close that aperture. An abutment extends laterally outwardly beyond the periphery of the aperture to engage the surface of the portion of the building adjacent one end of that aperture, and that abutment will fix the extent to which that closure can be moved inwardly and away from that one end of that aperture. Securing means are provided to fix the extent to which the closure can be moved toward that one end of the aperture; and that securing means coacts with the abutment to hold the closure at a fixed distance from that one end of that aperture. An opening in the closure and a short length of electrical conduit, which communicates with that opening, coact to provie a passage, for an electrical conductor, which extends from one face of the closure to and through that closure to the opposite face of that closure. Once the insertion-type mounting has been installed within the aperture, a suitable electrical outlet can be secured to it.

24 Claims, 8 Drawing Figures

INSERTION-TYPE MOUNTING FOR AN ELECTRICAL OUTLET

This invention relates to improvements in insertion-type mountings for electrical outlets. More particularly, this invention relates to improvements in insertion-type mountings, for electrical outlets, which can be inserted within apertures that have been formed in portions of buildings.

It is, therefore, an object of the present invention to provide an improved insertion-type mounting, for an electrical outlet, which can be inserted within an aperture that has been formed in a portion of a building.

It frequently is desirable or necessary to provide electrical outlets at selected points on the floors of buildings. Where ducts or channels have not previously been embedded within those floors, and where it would be objectionable to have conduits or armored cables extending along the upper surfaces of those floors, it is customary to form apertures in those floors, to mount electrical outlets at those apertures, and to pass electrical conductors upwardly through those apertures to those electrical outlets. Those electrical conductors should be enclosed and confined within electrical conduits which extend along the under surfaces of the floors to those apertures; and those electrical outlets should be held solidly in position adjacent those apertures. Consequently, it would be desirable to provide a mounting, for an electrical outlet, which could be inserted within an aperture in a floor of a building, which could support one end of an electrical conduit located below that floor, and which could support an electrical outlet at the upper surface of the floor. The present invention provides such a mounting; and it is, therefore, an object of the present invention to provide a mounting, for an electrical outlet, which can be inserted within an aperture in a floor of a building, which can support one end of an electrical conduit located below that floor, and which can support an electrical outlet at the upper surface of that floor.

It would be desirable to provide a mounting, for an electrical outlet, which could be inserted within, and thereafter held solidly against movement relative to, an aperture in the floor of a building. The present invention provides such a mounting; and that mounting does not require a mass of cement, grout, mastic or the like to hold it solidly against movement relative to the aperture. It is, therefore, an object of the present invention to provide a mounting which can be inserted within, and thereafter held solidly against movement relative to, an aperture in the floor of a building, but which does not require a mass of cement, grout, mastic or the like to hold it in position.

The mounting, for an electrical outlet, which is provided by the present invention includes a closure that can be inserted within, and that will effectively close, an aperture in a floor or wall of a building. That closure has one or more openings therein which accommodate one or more short lengths of electrical conduit. In addition, that mounting has abutments which project laterally outwardly beyond the periphery of the aperture to overlie the portions of the wall or floor defining that aperture; and those abutments limit the extent to which the closure can be telescoped inwardly through that aperture. Further, that mounting includes means to limit the extent to which the closure can be moved outwardly of that aperture; and the abutments coact with that means to hold the closure solidly in position relative to the aperture. In addition, the mounting has openings therein to receive screws which will secure the electrical outlet to that mounting. It is, therefore, an object of the present invention to provide a mounting, for an electrical outlet, which includes a closure that can be inserted within, and that will effectively close, an aperture in a floor or wall of a building, which includes one or more short lengths of electrical conduit, which includes abutments that project laterally outwardly beyond the periphery of the aperture to overlie the portions of the wall or floor defining that aperture, which includes means that coact with the abutments to hold the closure fixed against movement relative to the aperture, and which includes openings to receive screws that will secure that electrical outlet to the mounting.

The closure of the mounting, for an electrical outlet, provided by the present invention will underlie and confine a quantity of fire-resistant material; and that fire-resistant insulating material will effectively fill the aperture in the floor or wall of the building. In doing so, that fire-resistant insulating material will enable that floor or wall to effectively isolate the space at one face of that floor or wall from a fire which might develop in the space at the opposite face of that floor or wall. it is, therefore, an object of the present invention to provide a mounting, for an electrical outlet, which has a closure that can underlie and confine a quantity of fire-resistant insulating material.

Other and further objects and advantages of the present invention should become apparent from an examination of the drawing and accompanying description.

In the drawing and accompanying description, some preferred embodiments of the present invention are shown and described but it is to be understood that the drawing and accompanying description are for the puspose of illustration only and do not limit the invention and that the invention will be defined by the appended claims.

DETAILED DESCRIPTION OF THE PREFERRED EMBODIMENTS

Figures 1, 2:
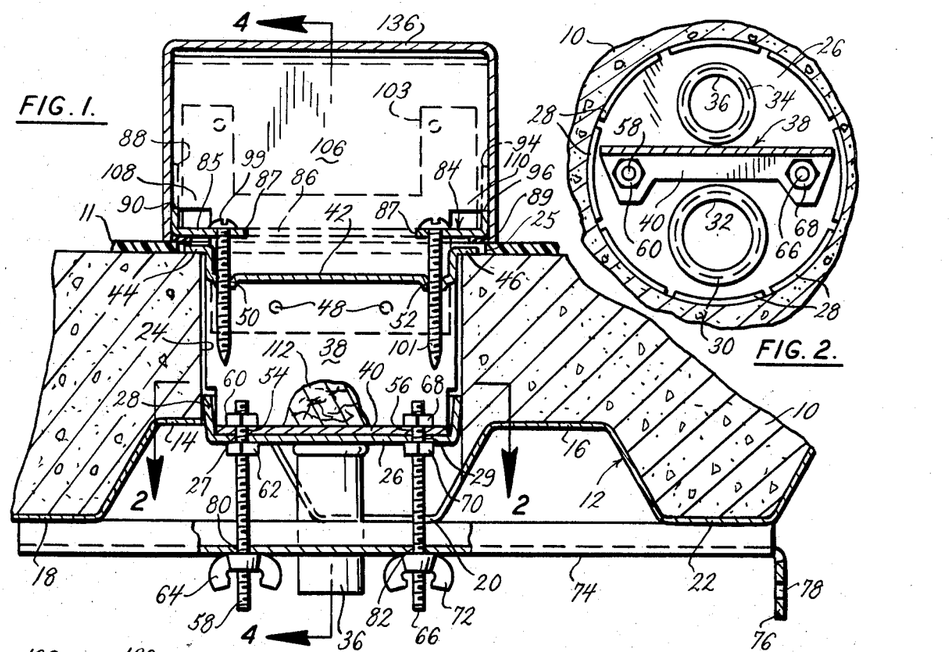
FIG. 1 is a vertical section through the floor of a building, through a mounting disposed within an aperture in that floor, and through an electrical outlet secured to that mounting.
FIG. 2 is a sectional view through the floor and mounting shown in FIG. 1, and it is taken along the plane indicated by the line 2—2 in FIG. 1.
Figure 3:
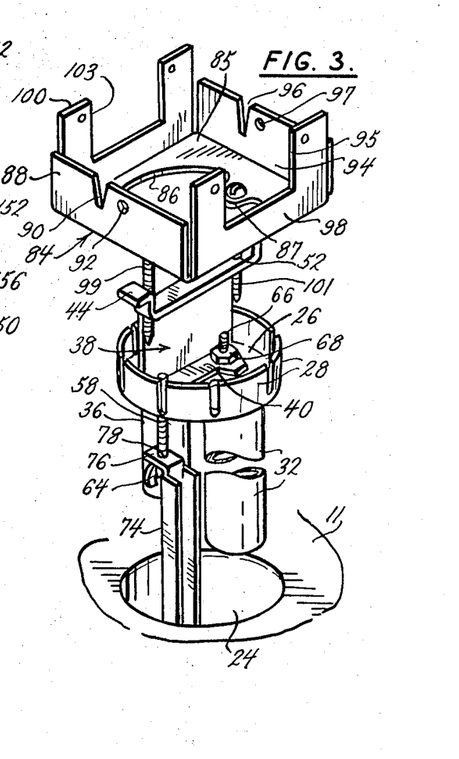
FIG. 3 is a perspective view, on a smaller scale, of the mounting and part of the electrical outlet of FIGS. 1 and 2, and it shows that mounting being telescoped through the aperture in the floor.

Referring particularly to FIGS. 1-3, the numeral 10 denotes a floor of a building; and that floor is shown as being made of concrete. However, the mounting of the present invention is not limited to use with floors, and, instead, could be used with walls and ceilings. Further, the mounting of the present invention is not limited to floors, walls and ceilings that are made of concrete and, instead, could be used with floors, walls and ceilings that are made of stone, brick or other solid materials. The numeral 11 denotes a covering for the floor 10; and that covering could take the form of a continuous layer of linoleum, vinyl plastic or the like, or could take the form of a series of tiles formed of linoleum, vinyl plastic or the like. The numeral 12 generally denotes a metal form which was used to support the concrete of the floor 10 when that concrete was being poured; and that metal form constitutes an integral part of that floor. That metal form has upwardly-displaced planar portions 14 aand 16, has lower planar portions 18, 20 and 22, and has intervening inclined portions. The upwardly-displaced planar portions 14 and 16 reduce the mass, and hence the weight and cost, of the floor 10.

The numeral 24 denotes a cylindrical aperture which extends through the floor covering 11, through the floor 10, through parts of the planar portions 14 and 20, and through parts of the adjacent intervening inclined portions of the metal form 12. Although that aperture could be formed in various ways, it preferably will be formed by use of a core drill. In one preferred embodiment of the present invention, the diameter of the aperture 24 is 3 ½ inches. The numeral 25 denotes notches which are formed in the floor covering 11 at opposite sides of the upper end of the aperture 24; and those notches are easily formed by a pocket knife or other cutting instrument. The floor 10, the floor covering 11, and the metal form 12 are of standard and usual design and are not, per se, parts of the present invention.

Figure 4:
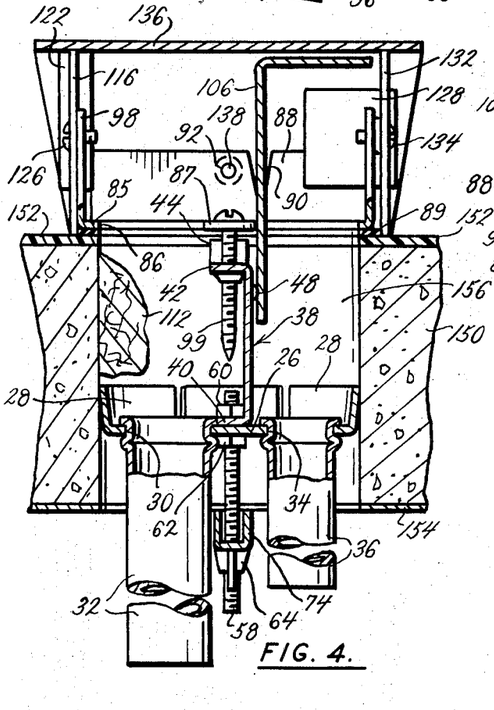
FIG. 4 is a vertical section, on the scale of FIG. 1, through the mounting and electrical outlet of FIG. 1 as they appear when associated with an aperture in a different floor.

The numeral 26 denotes the closure of one preferred embodiment of mounting, for an electical outlet, which is provided by the present invention; and that closure is planar in nature and is circular in plan. That closure has openings 27 and 29 therein; and those openings are intermediate the center and the periphery of that closure. Openings 30 and 34 also are formed in the closure 26; and the centers of those openings define a line which is approximately normal to a line defined by the centers of the openings 27 and 29. As shown particularly by FIGS. 2 and 4, the opening 30 is larger than the opening 34; and the opening 34 is substantially larger than either of the openings 27 and 29. The numeral 28 denotes fingers which extend upwardly from the plane of the closure 26, and which coact to define an interrupted annular flange. In their normal unstressed condition, those fingers incline slightly outwardly from a line which is normal to the plane of the closure 26, as indicated by FIGS 1 and 4. The closure 26 preferably is formed by punching and bending operations so the fingers 28 are integral parts of that closure.

The numeral 32 denotes a short section of thin-walled electrical conduit which has the upper end thereof rolled, swaged or otherwise cold-formed into locking engagement with the portion of the closure 26 that defines the opening 30. The numeral 36 denotes a second short section of thin-walled electrical conduit which has the upper end thereof rolled, swaged or otherwise cold-formed into locking engagement with the portion of the closure 26 that defines the opening 34. In the said one preferred embodiment of the present invention, the section 32 of electrical conduit has a larger inner diameter than does the section 36 of electrical conduit. The short sections 32 and 36 of electrical conduit can have any desired diemeters, wall thicknesses and lengths; but, in the said one preferred embodiment, the section 32 has an inner diameter of one inch and has an overall length of approximately 5 to 6 inches, and the section 36 has an inner diameter of three quarters of an inch and has an overall length of approximately 5 to 6 inches. Suitable connectors, not shown, can be telescoped over the lower ends of the sections 32 and 36, and those connectors can be used to connect further sections of appropriately-sized electrical conduits to the sections 32 and 36.

The numeral 38 generally denotes a vertically-extending bracket which is part of the said one preferred embodiment of mounting provided by the present invention; and that bracket has a horizontally-directed foot 40 and a horizontally-directed upper flange 42. Ear-like abutments 44 and 46 are displaced both laterally and vertically from, but are integral with, the flange 42. Dimples 48 project outwardly from the vertically-directed portion of the bracket 38, as indicated particularly by FIG. 4; and those dimples lie on a horizontal line which is spaced a short distance below the flange 42, as indicated by FIG. 1. The bracket 38, the foot 40, the flange 42, and the ears 44 and 46 preferably are formed from a single piece of metal by suitable punching and bending operations.

Openings 50 and 52 are provided in the flange 42 on the bracket 38 adjacent the opposite ends of that flange. Openings 54 and 56 are provided in the foot 40 of the bracket 38; and those openings are disposable in register with the openings 27 and 29, respectively, in the closure 26.

The numeral 58 denotes an elongated threaded rod which is dimensioned to pass through the aligned openings 27 and 54 in the closure 26 and in the foot 40 of bracket 38, respectively. The numeral 60 denotes a nut which is threaded onto the upper end of the threaded rod 58 to overlie the foot 40 of bracket 38, and the numeral 62 denotes a second nut which is threaded onto that threaded rod to underlie the closure 26. The nut 62 will be set a predetermined distance below the upper end of the threaded rod 58, that upper end will be passed through the aligned openings 27 and 54 in the closure 26 and in the foot 40, respectively, and then the nut 60 will be threaded onto that upper end and tightened into intimate engagement with the upper surface of that foot. The threaded rod 58 and the nuts 60 and 62 will, thereupon, coact to hold one end of the bracket 38 in intimate engagement with one side of the closure 26, and also will coact to hold that threaded rod rigidly fixed relative to that closure and that bracket. The numeral 64 denotes a wing nut which can be threaded onto the lower end of the threaded rod 58. The numeral 66 denotes a threaded rod which can be identical to the threaded rod 58; and the upper end of that threaded rod extends through the aligned openings 29 and 56 in the closure 26 and in the foot 40 of bracket 38 respectively. The numeral 68 denotes a nut which is threaded onto the upper end of the threaded rod 66 to overlie the foot 40 of bracket 38, and the numeral 70 denotes a second nut which is threaded onto that threaded rod to underlie the closure 26. The nut 70 will be set a predetermined distance below the upper end of the threaded rod 66, that upper end will be passed through the aligned openings 29 and 56 in the closure 26 and in the foot 40, respectively, and then the nut 68 will be threaded onto that upper end and tightened into intimate engagement with the upper surface of that foot. The threaded rod 66 and the nuts 68 and 70 will coact to hold the opposite end of the bracket 38 in intimate engagement with the opposite side of the closure 26, and also will coact to hold that threaded rod rigidly fixed relative to that closure and that bracket. The numeral 72 denotes a wing nut which can be threaded onto the lower end of the threaded rod 66.

The numeral 74 denotes an elongated stop which is shown as a U-shaped channel. That stop has an ear 76 at one end thereof, and that ear has an opening 78 therein. As indicated particularly by FIGS. 1 and 3, the ear 76 is a continuation of the metal which forms the web of the stop 74, and that stop is bent away from that web in a direction opposite to the direction in which the flanges of that stop are bent away from that web. The channel-shaped configuration for the stop 74 is preferred, because it gives that stop a high strength-to-weight ratio. However, if desired, elongated stops of other configurations could be used. Openings 90 and 82 are provided in the web of the support 74, as indicated particularly by FIG. 1; and those openings accommodate the lower ends of the threaded rods 58 and 66, respectively.

The closure 26 and its fingers 28, the sections 32 and 36 of electrical conduit, the vertically-extending bracket 38 with its foot 40 and flange 42 and abutments 44 and 46, the threaded rods 58 and 66, the stop 74 and the various nuts associated with those threaded rods and that stop constitute the mounting, for an electrical outlet, of the embodiment of invention of FIGS. 1–4. That mounting is intended to be disposed adjacent, and to effectively close, apertures in the floors or walls of a building. As shown by FIG. 1, the closure 26 has at least a portion thereof disposed within the aperture 24, it is disposed transversely of the axis of that aperture, and it effectively closes that aperture.

For convenience and economy in storage and shipment, the mounting of FIGS. 1–4 has the elongated stop 74 thereof set in parallel relation to the sections 32 and 36 of electrical conduit when that mounting is assembled before it is shipped from the factory. To set that elongated stop in such parallel relation, the wing nut 64 is removed from the threaded rod 58, the opening 78 in the ear 76 on that stop is telescoped upwardly over the lower end of that threaded rod, and then that wing nut is again threaded onto the lower end of that threaded rod. Although the ear 76 on the stop 74 is shown as being spaced an appreciable distance below the lower surface of the closure 26 in FIG. 3, that ear will be held in abutting engagement with that lower surface by the wing nut 64 at the time the mounting is shipped from the factory. That wing nut will, however, be backed off to the position shown by FIG. 3, before closure 26 is forced downwardly into the aperture 24, to facilitate the gripping, and removal, of that wing nut from a point below the floor 10.

The mounting, for an electrical outlet, shown by FIGS. 1–4 is particularly useful in buildings which do not have ducts or channels embedded within the floors thereof, and in buildings which have embedded ducts or channels but do not have those embedded ducts or channels in desired locations. In using that mounting, a core drill or other suitable implement will be used to form the aperture 24; and then the notches 25 will be formed in the floor covering 11 at two sides of that aperture. Those notches will be made large enough to readily accommodate the abutments 44 and 46 at the opposite ends of the flanges 42 on the bracket 38.

Thereafter, the wing nut 64 will be backed off to the position shown by FIG. 3; and then the lower end of the elongated stop 74, the lower end of the sections 34 and 36 of electrical conduit, and the planar portion of the closure 26 will be successively telescoped downwardly through the upper end of that aperture. The downward movement of that elongated stop, of the sections of electrical conduit, and of that portion of that closure will be continued until the abutments 44 and 46 on the flange 42 at the upper end of the bracket 38 engage, and are held by, the portions of the upper surface of the floor 10 which are exposed by the notches 25 in the floor covering 11. Those abutments will coact with those exposed portions of the floor 10 to positively limit the extent to which the closure 26 and the sections 32 and 36 of electrical conduit can be moved downwardly within the aperture 24. As the closure 26 is introduced into, and then moved downwardly through, the upper end of the aperture 24, the fingers 28 on that closure will firmly engage the portions of the floor 10 which define that aperture. Those fingers will continue to firmly engage those portions of that floor as that closure is moved downwardly within that aperture; and, when that closure reaches the position shown by FIG. 1, those fingers will coact with the planar portion of that closure to effectively close that aperture. In addition, those fingers will resist any forces which could tend to shift that closure relative to the portions of the floor 10 which define the aperture 24. Although the fingers 28 are actually spaced from each other, the spacings between those fingers are so small, and the circumferential extents of those fingers are so large, that those fingers act as an essentially-continuous flange. As a result, the fingers 28 can coact with the planar portion of the closure 26 to effectively close the aperture 24 in the floor 10.

After the abutments 44 and 46 have been pressed downwardly into seating engagement with the exposed portions of the floor 10, the wing nut 64 will be removed from the lower end of the threaded rod 58 to free the elongated stop 74 from that threaded rod. Also, the wing nut 72 will be removed from the lower end of the threaded rod 66; and, thereupon, the openings 80 and 82 in the web of that elongated stop will be telescoped upwardly over the lower ends of the threaded rods 58 and 66, respectively, as shown by FIG. 1. At such time, the wing nut 64 will be threaded onto the lower end of the threaded rod 58, and the wing nut 72 will be threaded onto the lower end of the threaded rod 66; and then those wing nuts will be tightened to force the elongated stop 74 upwardly into engagement with the metal form 12. That elongated stop is made long enough to project outwardly beyond the sides of the aperture 24 and to span at least two of the voids defined by the inclined intervening portions of the metal form 12.

As shown by FIG. 1, the elongated stop 74 is made long enough so the ends thereof can solidly engage at least two of the lower planar portions of the metal form 12, regardless of where the aperture 24 is drilled in the floor 10. For example, in FIG. 1, even though that elongated stop is not able to engage any part of the lower planar portion 20 of that metal form, because the overlying area of that planar portion was cut away when the aperture 24 was formed, the opposite ends of that elongated stop engage the lower planar portions 18 and 22. Even if the aperture 24 happened to be exactly centered relative to the lower planar portion 20, the left-hand end of that elongated stop would still underlie and bear against part of the lower planar portion 18 of the metal form 12, and the right-hand end of that elongated stop would underlie and bear against the lower planar portion 22 of that metal form. In this way, the elongated stop 74 can solidly engage the floor 10, of the metal form 12 is an integral part, and can thereby prevent upward movement of the mounting realtive to the aperture 24. The wing nuts 64 and 72 make it easy for the installer to lock the elongated stop 74 solidly in position against the under surface of the metal form 12, and thereby hold the abutments 44 and 46 on the flange 42 solidly in engagement with the exposed portions of the floor 10. It thus should be apparent that the mounting provided by the present invention can be set in position adjacent the aperture 24, and then locked against shifting relative to, or dislodgment from, that aperture.

The numeral 84 generally denotes a support which is part of an electrical outlet; and that support can be identical to the similarly-numbered support which is shown and described in Klinkman et al., application Ser. No. 243,792 for Plural-Cell Duct which was filed on Apr. 13, 1972 U.S. Pat. No. 3,751,576. The support 84 is box-like in configuration, and it has a generally rectangular floor 85 with a circular opening 86 therein. Semi-circular ears 87 extend into that opening; and those ears have openings therein which are disposable in register with the openings 50 and 52 in the flange 42 on the bracket 38. A resilient gasket 89 is shown intermediate the floor 85 of the support 84 and the floor covering 11. That gasket has an opening which has the same configuration as the opening 86 in the floor 85 of the support 84; and that gasket will keep any water which is spilled or mopped onto the floor covering 11 from reaching, and passing downwardly through, the aperture 24.

The support 84 has a side wall 88 with a narrow slot 90 extending downwardly from the upper edge thereof; and the walls of that slot coverage slightly as they extend from the top to the bottom of that slot. A threaded opening 92 is provided in the wall 88, as indicated particularly by FIGS. 3 and 4. The support 84 has a second side wall 94 with a slot 96 therein; and the slot 96 is similar to, and in register with, the slot 90 in the wall 88, as indicated by FIG. 3. In addition, the side wall 94 has a threaded opening 97 therein, as indicated by FIG. 3; and that opening is in register with the threaded opening 92 in the wall 88. The numeral 98 denotes one of the walls of the support 84; and a wide notch 95 extends downwardly from the upper edge of that wall to make that wall U-shaped in elevation, as indicated by FIG. 3. The numeral 100 denotes the opposite wall of the support 84; and a wide notch 103 extends downwardly from the upper edge of that wall to make that wall U-shaped in elevation.

A self-tapping screw 99 extends downwardly through the opening in oen of the ears 87 and seats in the opening 50 in the flange 42 on the bracket 38. The head of that self-tapping screw will be tightened down into intimate engagement with the ear 87; and the thread of that screw will intimately engage the metal of the flange 42 on the bracket 38. The overall result is that the screw 99 will effectively "ground" the support 84 to the closure 26, and thus to the sections 32 and 36 of electrical conduit. The numeral 101 denotes a similar screw which extends downwardly through the opening in the other ear 87 of the support 84 to seat in the opening 52 in flange 42 on the bracket 38. The head of that screw will intimately engage that other ear 87, and the thread of that screw will intimately engage the metal of that other ear and of the flange 42. Consequently, the screw 101 also will effectively "ground" the support 84 to the closure 26, and thus to the sections 32 and 36 of electrical conduit.

The numeral 106 denotes a divider which has a vertically-directed section, and which has a horizontally-directed section at the upper end of that vertically-directed section. Wings 108 and 110 project outwardly from the sides of the upper portion of the vertically-directed section of divider 106; an the wing 108 has the lower edge thereof disposed within the slot 90 in side wall 88, while the wing 110 has the lower edge thereof disposed within the slot 96 in side wall 94. The thicknesses of the wings 108 and 110 are less than the widths of the upper ends of the slots 90 and 96, respectively, in the side walls 88 and 94 of the support 84; but those thicknesses are slightly greater than the widths of the lower ends of those slots. Consequently, as those wings are pressed downwardly into those slots, the divider 106 will be effectively "grounded" to the support 84, and thus to the sections 32 and 36 of electrical conduit.

As the wings 108 and 110 are moved downwardly toward, and then into, the slots 90 and 96, respectively, the lower edge of the vertically-directed section of that divider will move downwardly through the opening 86 in the floor 85 of the support 84 and into the aperture 24. Continued downward movement of the divider 106 will cause the lower edge of the vertically-directed section thereof to move downwardly below the level of the flange 42 and into coextensive relation with the upper end of the vertically-directed portion of the bracket 38, as indicated particularly by FIG. 4. The dimples 48 will serve as friction-reducing points of engagement between the vertically-directed section of the divider 106 and the vertically-directed protion of the bracket 38. Specifically, those dimples will keep any burrs or rough spots, which may happen to be on the lower edge of the vertically-directed section of the divider 106, from interfering with downward movement of that divider. The vertically-directed section of the divider 106 will coact with the vertically-directed portion of the bracket 38 to subdivide the space within the aperture 24 into two effectively-isolated spaces. This is desirable, because it will enable the conductors which are subsequently passed upwardly through the section 32 of electrical conduit to be physically and electrically isloated from the conductors which are subsequently passed upwardly through the section 36 of electrical conduit.

The numeral 112 denotes a fire-resistant material which will be deposed within the aperture 24 above the closure 26 after conductors have been passed upwardly through the section 32 of electrical conduit and after further conductors have been passed upwardly through the section 36 of electrical conduit. That fire-resistant material will fill the small gaps between adjacent fingers 28 of that closure, will fill any gaps between the fingers 28 and the portions of the floor 10 which define the aperture 24, and will fill the upper ends of the sections 32 and 36 of electrical conduit. As a result, that fire-resistant material will coact with the closure 26, and its fingers 28 and its sections 32 and 36 of electrical conduit, to effectively close the aperature 34, and to keep flames at the under surface of the floor 10 from passing through that aperture to the upper surface of that floor. Although various fire-resistant material could be used, one very useful fire-resistant material is a ceramic fiber product which is sold by the Babcock and Wilcox Company as Bulk A KAOWOOL.

The numeral 116 in FIG. 4 denotes a metal plate which preferably has a finished outer surface and which has notches, not shown, that extend downwardly from the upper edge thereof to accommodate grommets, such as a grommet 122. Screws 126 extend through openings in the plate 116 and seat in the openings which are shown in the end wall 98 of the support 84 in FIG. 3. The numeral 128 denotes a duplex outlet receptacle; and screws, not shown, extend through openings at the outer ends of that duplex outlet receptacle and seat within threaded openings which are shown in the end wall 100 of the support 84 in FIG. 3. A cover plate 132 is secured to that duplex outlet receptable by a screw 134.

The numeral 136 denotes a metal cover which has a horizontally-directed upper portion and which has downwardly-extending side portions that coact to give that cover an inverted U-shaped configuration. Screws 138 extend inwardly through openings in the downwardly-extending side portions of that cover and seat in the openings 92 and 97 in th side walls 88 and 94, respectively, of the support 84 to releasably secure that metal cover to that support. The cover 136 will coact with the plate 116 that supports the grommets 122 and with the cover plate 132 for the duplex outlet receptacle 128 to completely enclose the tops, sides and ends of the support 84. As a result, that cover coacts with the divider 106 and with the bracket 38 to effectively isolate the conductors which extend upwardly through the section 32 of electrical conduit from the conductors which extend upwardly through the section 36 of electrical conduit.

The support 84, the plate 116 and its grommets 122, the duplex outlet receptacle 128, the cover plate 132, and the metal cover 136 can be identical to the similarly-numbered components in the said Klinkman et al application; and they constitute an electrical outlet which is solidly held in position adjacent the aperture 24 by the mounting of FIGS. 1-3. The divider 106 can be similar to, and can perform many of the functions of, the divider shown in the said Klinkman et al application. If desired, supports, plates, grommets, outlet receptacles, metal covers and dividers other than the support 84, the plate 116 and its grommets 122, the duplex outlet receptacle 128, the cover plate 132, the metal cover 136 and the divider 106 could be used with the mounting shown by FIGS. 1-3.

Referring particularly to FIG. 4, the mounting of FIGS. 1-3 is shown disposed adjacent an aperture 156 in a floor 150. That floor has a floor covering 152 thereon, and that floor is underlain by a metal form 154. The floor 150 differs from the floor 10 in FIGS. 1-3 in that the metal form 154 is essentailly flat throughout, an it is not provided with upwardly-displaced planar portions such as the upwardly-displaced portions 14 and 16 of FIG. 1. Because the metal form 154 of the floor 150 is not provided with upwardly displaced planar portions, the elongated stop 74 in FIG. 4 could be shorter than it has to be made in FIG. 1 to provide full bearing on the lower planar portions 18 and 22. However, to make the mounting of FIGS. 1-4 universally usable with floors of different design and construction, the elongated support 74 in FIG. 4 is left as long as the elongated support 74 in FIG. 1.

The procedure that is used to install the mounting of FIGS. 1-3 within the aperture 156 in the floor 150 of FIG. 4 is essentially identical to he hereinbefore-described procedure that is used to install that mounting within the aperture 24 in the floor 10. In both procedures, the wing nut 64 will be backed off to the position shown by FIG. 3; and then the lower end of the elongated stop 74, the lower end of the sections 32 and 36 of electrical conduit, and the planar portion of the closure 26 will be successively telescoped downwardly through the upper end of the aperture in the floor until the abutments 44 and 46 solidly seat against the exposed portions of the upper surface of the floor. Thereafter, the elongated stop 74 will be caused to seat solidly against the metal forms which constitute the lower surfaces of those floors. In FIG. 4, as in FIGS. 1-3, the wing bolts 64 and 72 coact with the abutments 44 and 46 to fixedly hold the closure 26 in position within the aperture in the floor. Also, the fingers 28 of that closure coact with the portions of the floor, which define that aperture, to strongly resist any forces which could tend to move that closure relative to that aperture. Moreover, those fingers coact with the planar portion of that closure and with the sections 32 and 36 of electrical conduit to effectively close that aperture.

After the mounting of FIGS. 1-3 has been solidly secured in position adjacent the aperture 156 in the floor 150 of FIG. 4, the support 84 will be secured to the bracket 38 by the screws 99 and 101. Conductors will then be passed upwardly through the sections 32 and 36 of electrical conduit; and fire-resistant material 112 will be used to fill the portion of the aperture 156 which is above the closure 26, to fill the small gaps between adjacent fingers 28 of that closure, to fill any gaps between the fingers 28 and the portions of the floor 150 which define the aperture 156, and to fill the upper ends of the sections 32 and 36 of electrical conduit. Subsequently, those conductors can be passed through the grommets 122 or secured to the terminals of the duplex outlet receptacle 128, and then the divider 106 and the metal cover 126 will be set in position.

Figures 5, 8:
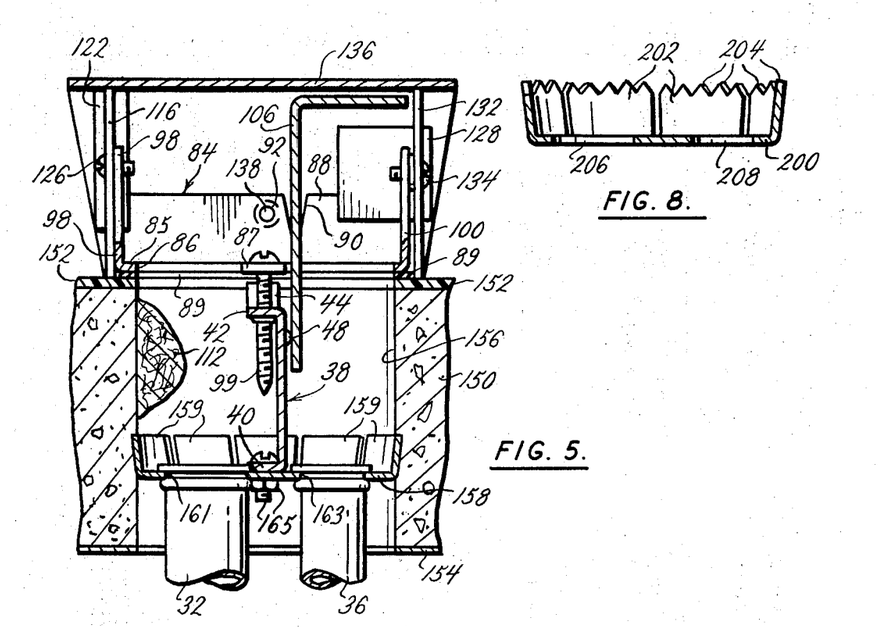
FIG. 5 is a vertical section through the floor of a building, through a further mounting disposed within an aperture in that floor, and through an electrical outlet secured to that mounting.
FIG. 8 is a vertical section, on a larger scale, through a closure of a mounting which could be substituted for the closure of any of the mountings in FIGS. 5 and 6.

Referring particularly to FIG. 5, the numeral 158 denotes a closure which has upwardly-directed fingers 159 thereon that are close enough to each other to effectively act as an annular flange for that closure. That closure has openings 161 and 163 therein which accommodate the upper ends of short sections 32 and 36 of electrical conduit. The closure 158 has further openings, not shown, which accommodate the bolts of bolt and nut combinations 165. The closure 158 is very similar to the closure 26 in FIGS. 1–4; but it it formed and dimensioned so the upper edges of the fingers 159 thereof will gouge, scar, bite into or roughen the inner surface of the aperture 156 in the floor 150 as that closure is forced downwardly into that aperture. Consequently, as indicated by FIG. 5, the upper ends of the fingers 159 will, at least to some extent, bite into the inner surfaces of portions of the floor 150 which define the aperture 156.

The floor 150, the metal form 154, the aperture 156, the floor covering 152, the sections 32 and 36 of electrical conduit, the fire-resistant material 112, the bracket 38 with its foot 40 and its flange 42 and its abutments 44 and 46 and its dimples 48, the gasket 89, the support 84, the floor 85 of that support, the opening 86 in the floor 85, the ears 87 of that support, the side wall 88 of that support, the slot 90, the threaded opening 92, the self-tapping metal screw 99, the end walls 98 and 100, the divider 106, the metal plate 116, the grommet 122, the screws 126, the duplex outlet receptacle 128, the cover plate 132, the screw 134, the metal cover 136, and the screw 138 in FIG. 5 can be identical to the similarly-numbered components in FIG. 4. However, it should be noted that the bracket 38 is secured to the closure 158 by bolt and nut combinations 165 rather than by the elongated rods 58 and 66 and the nuts 60, 62, 68 and 70 of FIGS. 1–4. Further, it should be noted that the mounting of FIG. 5 does not have an elongated stop, such as the elongated stop 74 of FIGS. 1–4, or any other stop underlying the portions of the floor 150 which define the aperture 156. Instead, the biting action of the fingers 159 is relied upon to prevent undesired upward movement of the closure 158 relative to the aperture 156.

The closure 158 can be forced downwardly into position within the aperture 156, and yet can firmly resist upward movement relative to that aperture. This is due to the fact that the fingers 159 incline outwardly relative to the geometric axis of the closure 158, and thus act as inclined planes while that closure is being forced downwardly into position within the aperture 156. If any of those fingers strikes some of the aggregate or some other hard part of the concrete of the floor 150, that finger will bend or bow far enough inwardly to permit the closure 158 to continue to move downwardly within the aperture 156; but that finger, and the other fingers 159, will prevent any upward movement of the closure 158 within that aperture. Moreover, that finger and the other fingers 159, would respond to any forces, which tended to move the closure 158 upwardly relative to the aperature 156, to bite even more strongly into the inner surfaces of portions of the floor 150 which define that aperture. Consequently, with floors which are made of concrete into which the upper ends of the fingers 159 of the closure 158 could bite, it would be possible to make the mounting of FIG. 5 so it does not require any kind of stop below the floor 150.

Figure 6:
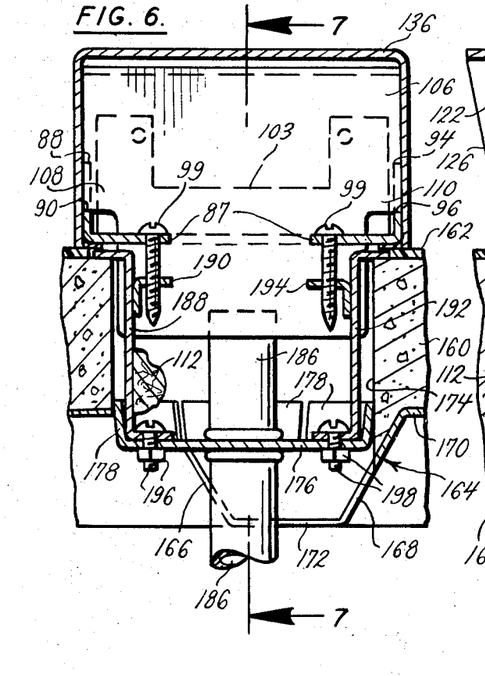
FIG. 6 is a vertical section through the floor of a building, through a still further mounting disposed within an aperture in that floor, and through an electrical outlet secured to that mounting.
Figure 7:
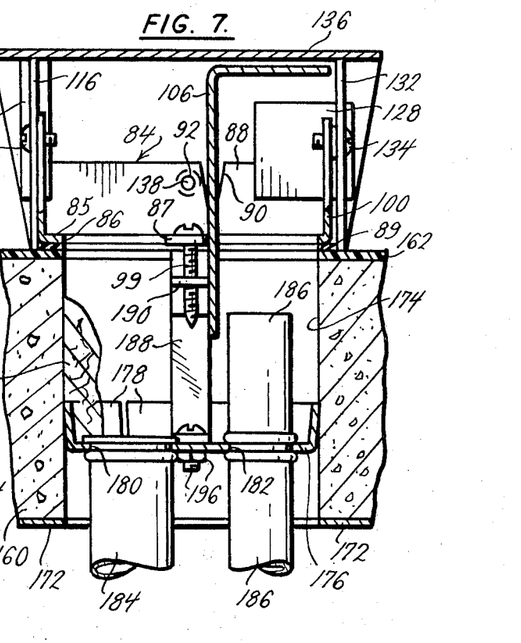
FIG. 7 is a sectional view through the floor, mounting, and electrical outlet shown in FIG. 6, and it is taken along the plane indicated by the line 7—7 in FIG. 6.

Referring to FIGS. 6 and 7, the numeral 160 denotes a concrete floor of a building; and that floor is overlain by a floor covering 162 of standard and usual form and design. A metal form 164 underlies the concrete of the floor 160 and constitutes an integral part of that floor. That metal form has upwardly-displaced planar portions 170, lower planar portions 172, and inclined intervening portions 166 and 168. A cylindrical aperature 174 is formed in the floor 160 by a suitable coring drill. The floor 160, the floor covering 162, and the metal form 164 can be identical to the floor 10, the floor covering 11, and the metal form 12 in FIGS. 1–3.

The numeral 176 denotes a closure which is circular in plan view and which has upwardly extending fingers 178. That closure has circular openings 180 and 182 therein; and the upper end of a section 184 of electrical conduit is suitably locked in position within the opening 180, while an intermediate portion of a section 186 of electrical conduit is suitably locked into position within the opening 182. The closure 176 and the ears 178 thereof are made of a sturdy and springy material. Although spring steel could be used in making the closure 176 and its fingers 178, other steels which are less expensive, but which are sturdy and springy, also could be used.

The fingers 178 will initially have an outward inclination, relative to the geometric axis of the closure 176, which is greater than the outward inclination shown by FIGS. 6 and 7; because those fingers will be forced to bend or bow inwardly as that closure is forced downwardly into the aperture 174. The restorative forces, which are developed within the fingers 178 as those fingers are forced inwardly to the positions shown by FIGS. 6 and 7, will enable the upper edges of those fingers to resist accidental movement of the closure 176 relative to the portions of the floor 160 which define the aperture 174. Those fingers will be strongly resistant to any forces which tend to cause the closure 176 to move upwardly relative to the aperture 174; because the upper edges of those fingers will respond to those forces to tend to move outwardly and bite into even tighter engagement with the walls of that aperture. Consequently, the closure 176, like the closure 158 in FIG. 5, does not require a stop to keep it from being moved upwardly through the aperture 174 in the floor 160.

The closure 176 of FIGS. 6 and 7 does not have a bracket, such as that bracket 38, secured to and extending upwardly from it; and such a bracket is not essential, because the upper end of the section 186 of electrical conduit extends well above the upper surface of the closure 176. As shown by FIGS. 6 and 7, the upper end of the section 186 of electrical conduit extends above the lower edge of the vertically-directed section of the divider 106.

A spacer 188 has an abutment at the upper end thereof which extends laterally outwardly relative to the closure 176, and that spacer has a foot at the lower end thereof which extends laterally inwardly of that closure. That foot is fixedly secured to the closure 176 by a bolt and nut combination 196. A similar spacer 192 has an abutment at the upper end thereof which extends laterally outwardly relative to the closure 176, and that spacer has a foot at the lower end thereof which extends laterally inwardly of that closure. The foot of the spacer 192 is fixedly secured to the closure 176 by a bolt and nut combination 198. An inverted L-shaped bracket 190 is spot welded or otherwise secured to the inner surface of an intermediate portion of the spacer 188; and a similar inverted L-shaped bracket 194 is spot welded or otherwise secured to the inner surface of an intermediate portion of the spacer 192. The horizontally-directed legs of the inverted L-shaped brackets 190 and 194 have vertically-directed openings therein; and those vertically-directed openings correspond to the vertically-directed openings in the flange 42 of the bracket 38 in FIGS. 1–5. The abutments at the upper ends of the spacers 188 and 192 correspond to the abutments 44 and 46 that are at the opposite ends of the flange 42 in FIGS. 1–5. The abutments at the upper ends of the spacers 188 and 192 will overlie the portions of the floor 160 which define the aperture 174, and will thereby prevent movement of the closure 176 downwardly below the position shown by FIGS. 6 and 7; and the interaction between the upper edges of the fingers 178 on that closure and those portions of that floor will effectively prevent upward movement of that closure relative to that aperture. Consequently, the closure 176 will effectively close the aperture 174, and also will serve as a stable mounting for the support 84 which will be secured to it by the screws 99.

The fact that the upper end of the section 186 of electrical conduit extends well above the planar portion of the closure 176 will force any conductors, which are passed upwardly through that section, to be passed upwardly to a point well above the lower edge of the vertically-directed section of the divider 106. As a result, that upper end of that section of electrical conduit will coact with the divider 106 to effectively keep those conductors from extending into the left-hand portion of the aperture 174, into the left-hand portion of the support 84, or into the left-hand portion of the metal cover 136. Consequently, the structure shown in FIGS. 6 and 7 can effectively keep any power-supplying conductors, which may be passed upwardly through the section 186 of electrical conduit, from entering the space in which conductors that extend upwardly through the section 184 of electrical conduit will be located.

As shown particularly by FIG. 7, the upper end of the section 186 of electrical conduit is spaced a short distance to the right of the lower end of the vertically-directed section of the divider 106. That spacing permits fire-resistant material 112 to be disposed between the the confronting surfaces of that upper end of that section of electrical conduit and that lower end of that vertically-directed section of divider 106. Further, that fire-resistant material can be pressed downwardly into the upper ends of the sections 184 and 186 of electrical conduit, and can be used to completely fill the entire area of the aperture 174 which is located above the planar portion of the closure 176.

FIG. 8 shows a closure 200 which could be used in place of the closure 158 in FIG. 5 or in place of the closure 176 in FIGS. 6 and 7. That closure has fingers 202 which extend upwardly from the planar portion of that closure; and those fingers have pointed projections 204 on the upper edges thereof. The planar portion of the closure 200 has circular openings 206 and 208 therein which can accommodate the upper ends of sections of electrical conduit, such as the sections 32 and 36 or the sections 184 and 186 of electrical conduit. The pointed projections 204 on the upper ends of the fingers 202 will make the resistance of the closure 200 to upward movement relative to any aperture in which it is mounted even greater than the resistance of the closure 158 or of the closure 176 to such upward movement. In many installations, pointed projections on the upper edges of the fingers will not be necessary; and hence the fingers 159 and 178, respectively, in FIG. 5 and in FIGS. 6 and 7 will, in such installations, be able to prevent upward movement of the closures 158 and 176, respectively, relative to the apertures in which those closures are disposed. However, in any installations where fingers with flat upper edges might not positively prevent upward movement of the closure bearing them, the closure 200 with its projection-equipped fingers should be used; because those projections would effectively resist any forces tending to move that closure upwardly relative to the aperture in which it may be disposed.

It should be noted that the bracket 38 in FIGS. 1–5 has a high surface-to-volume ratio, and that each of the spacers 188 and 192 also has a high surface-to-volume ratio. Such ratios are important; because they will enable that bracket and those spacers to radiate, rather than transmit, sizeable percentages of any heat which is transmitted to it or them by the underlying closure. In this way, the various mountings of the present invention help keep a fire, which may develop at once side of a floor, wall or ceiling, from starting a fire at the opposite side of that floor, wall or ceiling.

The various mountings, for electrical outlets, that are provided by the present invention can fully and effectively seal openings which are formed in the floors, ceilings and walls of buildings, and yet can permit electrical conductors to be passed through those floors, ceilings and walls. Further, those various mountings provide solid support for the electrical outlets used with them, and they also provide solid support for the ends of electrical conduits which are secured to the short lengths of electrical conduit of those various mountings. In addition, those various mountings help confine fire-resistant material; and they coact with that fire-resistant material to keep flames, at one side of a floor, ceiling or wall, from passing through the aperture in that floor, ceiling or wall and reaching the other side of that floor, ceiling or wall. Consequently, the various mountings provided by the present invention make it practical for electrical outlets to be set at various desired positions within buildings, even where those buildings do not have embedded ducts or channels, or have embedded ducts and channels which are not close to those desired positions.

Whereas the drawing and accompanying description have shown and described some preferred embodiments of the present invention, it should be apparent to those skilled in the art that various changes may be made in the form of the invention without affecting the scope thereof.

What I claim is:

1. An insertion-type mounting, for an electrical outlet, which is insertable within an aperture that has been formed through a portion of a building and which comprises a closure that has at least a portion thereof disposable within said aperture, said portion of said closure being spaced inwardly of and away from one end of said aperture, said closure being transverse of the axis of said aperture and substantially closing said aperture, an opening in said closure, a short section of electrical conduit that is secured to said closure so it is in connunication with said opening in said closure, said short section of electrical conduit coacting with said opening in said closure to provide a passage, for an electrical conductor, which extends from one face of said closure through said closure to the opposite face of said closure, an abutment that is disposable adjacent said one end of said aperture and that is dimensioned to extend laterally outwardly beyond the periphery of said aperture to engage one surface of said portion of said building, spacing means interconnecting said closure and said abutment but holding said abutment spaced away from said closure, said abutment coacting with said one surface of said portion of said building to limit movement of said closure through said aperture away from said one end of said aperture, and further means coacting with said portion of said building to limit movement of said closure through said aperture toward said one end of said aperture, whereby said abutment and said further means coact to hold said portion of said closure within said aperture at a predetermined, fixed distance from said one end of said aperture, said further means being spaced from said abutment and also being spaced from said one end of said aperture.

2. An insertion-type mounting as claimed in claim 1 wherein said short length of electrical conduit has one end thereof passing through said opening in said closure, and wherein said short length of electrical conduit has the opposite end thereof extendable outwardly and beyond said opposite end of said aperture.

3. An insertion-type mounting as claimed in claim 1 wherein said closure has a planar portion and fingers that are displaced angularly from said planar portion, wherein said fingers coact to effectively define an annulus, and wherein said fingers directly engage those parts of said portion of said building which define said aperture.

4. An insertion-type mounting as claimed in claim 1 wherein said closure has a planar portion and annulus-defining means angularly displaced from said planar portion, and wherein said annulus-defining means directly engages those parts of said portion of said building which define said aperture.

5. An insertion-type mounting as claimed in claim 1 wherein said closure engages those parts of said portion of said building which define said aperture at a number of circumferentially-spaced points, and wherein said further means includes surfaces on said closure at said circumferentially-spaced points.

6. An insertion-type mounting as claimed in claim 1 wherin said further means include circumferentially-spaced surfaces on said closure that directly engage those parts of said portion of said building which define said aperture.

7. An insertion-type mounting as claimed in claim 1 wherein said further means include an elongated stop that spans said aperture and that projects laterally outwardly beyond the peripery of said aperture to engage the opposite surface of said portion of said building.

8. An insertion-type mounting as claimed in claim 1 wherein said further means include an elongated stop that spans said aperture and that projects laterally outwardly beyond the periphery of said aperture to engage the opposite surface of said portion of said building, and also includes adjustable fasteners that extend between said closure and said elongated stop and that can be tightened to urge said elongated stop into intimate engagement with said opposite surface of said portion of said building.

9. An insertion-type mounting as claimed in claim 1 wherein fire-resistant material is disposed within that portion of said aperture which is between said closure and said one end of said aperture.

10. An insertion-type mounting as claimed in claim 1 wherein fire-resistant material is disposed within that portion of said aperture which is between said closure and said one end of said aperture, and wherein said fire-resistant material is a ceramic fiber product.

11. An insertion-type mounting as claimed in claim 1 wherein said insertion-type mounting includes dividing means that subdivides said aperture into separate areas, wherein said short section of electrical conduit communicates with one of said separate areas, wherein said closure has a second opening therein, wherein a second short section of electrical conduit is secured to said closure so it is in communication with said second opening in said closure, wherein said second short section of electrical conduit coacts with said second opening in said closure to provide a second passage, for a second electrical conductor, which extends from said one face of said closure through said closure to said opposite face of said closure, and wherein said second short section of electrical conduit communicates with the other of said separate areas.

12. An insertion-type mounting as claimed in claim 1 wherein said insertion-type mounting includes dividing means that subdivides said aperture into separate areas, wherein said short section of electrical conduit communicates with one of said separate areas, wherein said closure has a second opening therein, wherein a second short section of electrical conduit is secured to said closure so it is in communication with said second opening in said closure, wherein said second short section of electrical conduit coacts with said second opening in said closure to provide a second passage, for a second electrical conductor which extends from said one face of said closure through said closure to said opposite face of said closure, and wherein said dividing means and said spacing means are a plate-like bracket which is angularly-displaced from said closure.

13. An insertion-type mounting as claimed in claim 1 wherein said closure has a second opening therein, wherein a second short section of electrical conduit is secured to said closure so it is in communication with said second opening in said closure, wherein said second short section of electrical conduit coacts with said second opening in said closure to provide a second passage, for a second electrical conductor, which extends from said one face of said closure through said closure to said opposite face of said closure, and wherein said spacing means includes a plate-like bracket which is angularly-displaced from said closure and which is interposed between said openings in said closure.

14. An insertion-type mounting as claimed in claim 1 wherein points on said closure constitute said further means, and wherein said points directly engage those parts of said portion of said building which define said aperture.

15. An insertion-type mounting as claimed in claim 1 wherein said closure is made of springy material, and wherein said closure has portions thereof which directly engage those parts of said portion of said building which define said aperture.

16. An insertion-type mounting as claimed in claim 1 wherein said further means bite into those parts of said portion of said building which define said aperture.

17. An insertion-type mounting as claimed in claim 1 wherein said spacing means receives and holds adjustable fasteners which secure a support, for an electrical outlet, to said mounting.

18. An insertion-type mounting as claimed in claim 1 wherein said further means include an elongated stop that spans said aperture and that projects laterally outwardly beyond the periphery of said aperture to engage the opposite surface of said portion of said building, and wherein said elongated stop is releasably securable to said closure with its axis generally parallel to the axis of said short section of electrical conduit, whereby said elongated stop can be telescoped through said aperture as one end of said short section of electrical conduit is telescoped through said aperture.

19. An insertion-type mounting as claimed in claim 1 wherein said spacing means has a large surface-to-volume ratio to enable it to radiate appreciable amounts of heat that reach it.

20. An insertion-type mounting as claimed in claim 1 wherein said closure has a second opening therein, wherein a second short section of electrical conduit is secured to said closure so it is in communication with said second opening in said closure, wherein said second short section of electrical conduit coacts with said second opening in said closure to provide a second passage, for a second electrical conductor, which extends from said one face of said closure through said closure to said opposite face of said closure, and wherein said second short section of electrical conduit has one end thereof displaced a substantially greater distance from said closure than the corresponding end of the first said short section of electrical conduit is displaced from said closure.

21. A method of safely passing an electrical conductor through a floor, wall or ceiling of a building that comprises forming an aperture through said wall, floor or ceiling, solidly locking a short section of electrical conduit adjacent said aperture with one end of said short section of electrical conduit projecting outwardly beyond one end of said aperture, and effectively filling the opposite end and a substantial portion of the axial area of said aperture with fire-resistant material.

22. A method of safely passing an electrical conductor through a floor, wall or ceiling of a building that comprises forming an aperture through said wall, floor or ceiling, solidly locking a closure adjacent one end of said aperture, passing an electrical conductor through a short section of electrical conduit which is supported by said closure which has one end thereof projecting outwardly beyond said one end of said aperture, and effectively filling the opposite end and a substantial portion of the axial area of said aperture with fire-resistant material.

23. A mounting, for an electrical outlet, which is disposable adjacent an aperture that has been formed through a portion of a building and which comprises a closure that is disposable adjacent said aperture, said closure being transverse of the axis of said aperture and substantially closing said aperture, an opening in said closure, a short section of electrical conduit that is secured to said closure so it is in communication with said opening in said closure, said short section of electrical conduit coacting with said opening in said closure to provide a passage, or an electrical conductor, which extends from one face of said closure through said closure to the opposite face of said closure, an abutment that is disposable adjacent one of said ends of said aperture and that is dimensioned to extend laterally outwardly beyond the periphery of said aperture to engage one surface of said portion of said building, spacing means interconnecting said closure and said abutment but holding said abutment spaced away from said closure, said abutment coacting with said one surface of said portion of said building to limit movement of said closure away from said one end of said aperture, and further means coacting with said portion of said building to limit movement of said closure toward said one end of said aperture, whereby said abutment and said further means coact to hold said closure at a fixed distance from said one end of said aperture.

24. A mounting as claimed in claim 23 wherein said closure is cup-like in configuration and wherein said closure has at least a part of the annular portion thereof disposed within said aperture.

* * * * *